United States Patent
Mao et al.

(10) Patent No.: US 8,406,798 B2
(45) Date of Patent: Mar. 26, 2013

(54) METHOD AND APPARATUS FOR BRIDGING CALLS BETWEEN TWO DISPARATE PUSH-TO-TALK SYSTEMS

(75) Inventors: Wei Mao, Palatine, IL (US); Anatoly Agulnik, Deerfield, IL (US); Gregory D. Bishop, St. Charles, IL (US); Michael F. Korus, Eden Praire, MN (US); Scott J. Pappas, Lake Zurich, IL (US); Brian R. Poe, Cary, IL (US); Rummana S. Sadiq, South Barrington, IL (US); Peter E. Thomas, Schaumburg, IL (US); Steven E. Vanswol, Lombard, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 345 days.

(21) Appl. No.: 12/644,701

(22) Filed: Dec. 22, 2009

(65) Prior Publication Data

US 2011/0151917 A1  Jun. 23, 2011

(51) Int. Cl.
*H04B 7/00* (2006.01)
(52) U.S. Cl. ........ 455/518; 455/519; 455/520; 455/90.2
(58) Field of Classification Search .......... 455/517–520, 455/553.1, 90.2, 78, 79, 500, 426.1, 412.1, 455/414.1, 416, 420; 370/352, 389, 338, 370/328
See application file for complete search history.

(56) References Cited

U.S. PATENT DOCUMENTS

| 6,792,281 | B2 | 9/2004 | Upp et al. |
| 7,107,017 | B2 | 9/2006 | Koskelainen et al. |
| 7,328,042 | B2 * | 2/2008 | Choksi ........................ 455/552.1 |
| 8,050,700 | B2 * | 11/2011 | Copeland ...................... 455/519 |
| 8,170,594 | B1 * | 5/2012 | Sharma ......................... 455/518 |

(Continued)

FOREIGN PATENT DOCUMENTS

| WO | 2004028001 A2 | 4/2004 |
| WO | 2008027617 A1 | 3/2008 |

OTHER PUBLICATIONS

TIA Standard, Project 25 Trucking Overview—New Technology, Standards Project—Digital Radio, Technical Standards, TIA-102. AABA-A, (Revision of TIA/EIA-102.AABA), ANSi/TIA-102. AABA-A-2004, Approved: Jun. 22, 2004, Telecommunications Industry Association, Section 3.1.3.

(Continued)

*Primary Examiner* — Dominic E Rego
(74) *Attorney, Agent, or Firm* — Valerie Davis; Steven A. May

(57) ABSTRACT

A PTT bridging gateway between a first PTT system and a second disparate PTT system: receives an invitation to a first client to join a first group call for a first group comprising multiple member clients on the first PTT system, wherein the first client is one of the member clients of the first group; determines that the first client is mapped to a second group comprising multiple member clients on the second PTT system; and initiates a second group call to the multiple member clients on the second PTT system.

15 Claims, 1 Drawing Sheet

U.S. PATENT DOCUMENTS

| | | |
|---|---|---|
| 2004/0002351 A1* | 1/2004 | Upp et al. ............... 455/519 |
| 2004/0249949 A1* | 12/2004 | Gourraud et al. .......... 709/227 |
| 2005/0267969 A1* | 12/2005 | Poikselka et al. .......... 709/225 |
| 2007/0239824 A1 | 10/2007 | Shaffer et al. |
| 2008/0096597 A1* | 4/2008 | Vempati et al. ........... 455/518 |
| 2008/0119172 A1* | 5/2008 | Rao et al. ............... 455/414.1 |
| 2008/0200162 A1 | 8/2008 | Chowdhury et al. |
| 2008/0229390 A1* | 9/2008 | Holm et al. ................ 726/3 |
| 2008/0311894 A1* | 12/2008 | Klein et al. ............. 455/414.2 |
| 2009/0137263 A1* | 5/2009 | Abbate et al. ............. 455/518 |
| 2009/0193469 A1* | 7/2009 | Igarashi ................... 725/56 |
| 2009/0291704 A1* | 11/2009 | Korus et al. .............. 455/519 |
| 2010/0197333 A1* | 8/2010 | Shaffer et al. ............ 455/515 |
| 2010/0246535 A1* | 9/2010 | Lindner .................. 370/332 |

OTHER PUBLICATIONS

TIA/EIA Standard, Telephone Interconnect Requirements and Definitions (Voice Service), TIA/EIA-102.BADA (Upgrade of TIA/EIA/IS-102.BADA), ANSI/TIA/EIA-102.BADA-2000, Approved: Feb. 23, 2000, Telecommunications Industry Association, Sections. 3.10 and 3.10.1.

PCT International Search Report Dated Mar. 10, 2011.

* cited by examiner

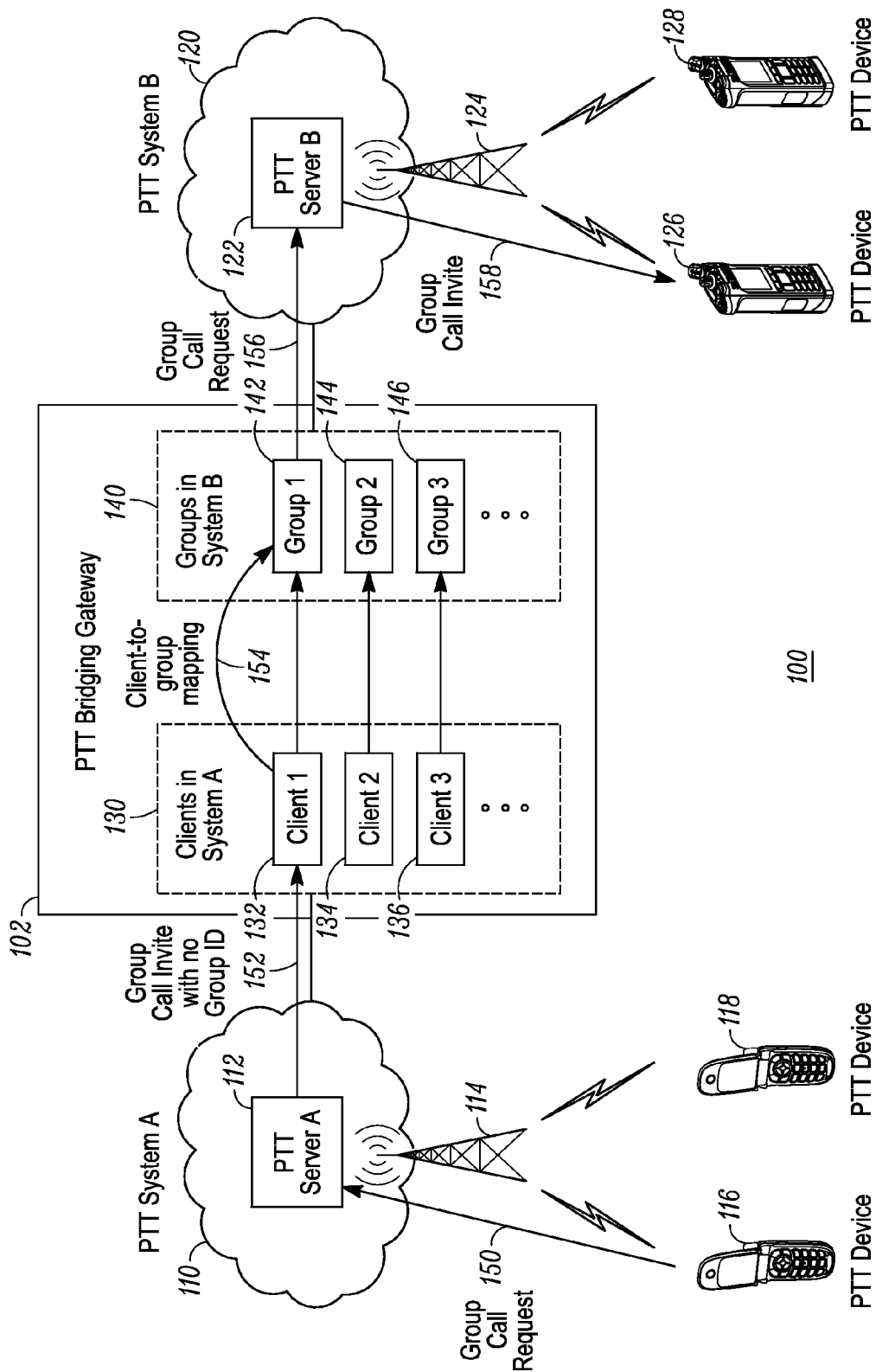

METHOD AND APPARATUS FOR BRIDGING CALLS BETWEEN TWO DISPARATE PUSH-TO-TALK SYSTEMS

TECHNICAL FIELD

The technical field relates generally to communication systems and more particularly to a push-to-talk (PTT) bridging gateway that bridges calls between two communication groups on disparate PTT communication systems.

BACKGROUND

Under some scenarios, a group of users of PTT radios connected to one PTT system desire to communicate with a group of users of PTT radios connected to a disparate PTT system. Due to differences between group management methods and call control protocols of various PTT systems, bridging techniques implemented in a bridging gateway are used to facilitate calls between the groups on disparate PTT systems. However, the known bridging techniques do not work in all cases, especially in the case where the group call control signaling received at the bridging gateway does not provide a group identifier for the group in the first system to enable the bridging gateway to determine the targeted group in the other PTT system.

Thus, there exists a need for a novel method and apparatus for bridging calls between two disparate PTT systems.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

FIG. 1 is a system diagram of a communication system that is superimposed with a signaling diagram for implementing a method for bridging group calls between two disparate push-to-talk systems in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, a push-to-talk (PTT) bridging gateway between a first PTT system and a second disparate PTT system performs a method for bridging group calls between the two disparate PTT systems. The method includes: receiving an invitation to a first client to join a first group call for a first group that includes multiple member clients, including the first client, on the first PTT system; determining that the first client is mapped to a second group that includes multiple member clients on the second PTT system; and initiating a second group call to the multiple member clients on the second PTT system.

Using embodiments of the disclosure, a PTT bridging gateway can facilitate calls between groups on two disparate PTT systems even where the bridging gateway has not been provided a group identifier for the group that initiated the call. Moreover, embodiments of the teachings herein can be implemented without requiring any modifications to the call control protocols of existing PTT systems. Those skilled in the art will realize that the above recognized advantages and other advantages described herein are merely illustrative and are not meant to be a complete rendering of all of the advantages of the various embodiments.

Referring now to the drawings, and in particular FIG. 1, a diagram of a communication system that is superimposed with a signaling diagram for implementing a method for bridging group calls between two disparate PTT systems in accordance with some embodiments is shown and indicated generally at 100. System 100 includes a PTT system A (110) and a PTT system B (120) that are coupled via a PTT bridging gateway 102. PTT system A and PTT system B both enable "push-to-talk" communications, which are half duplex communications where one user in a group call transits on his subscriber unit while the other members of the group receive on their subscriber units. However, PTT system A and PTT system B are "disparate" PTT systems meaning that these systems at the very least use different call control signaling protocols to initiate, modify, and terminate communication sessions, including but not limited to group calls, wherein various media (e.g., voice, data, etc.) is exchanged during the communication session.

For example, in one illustrative implementation, PTT System B is a Telecommunications Industry Association (TIA) APCO Project 25 compliant communication system that enables push-to-talk services, as described in TIA 102-series documents, using TIA 102-AA series of call control standards as the call control protocol. Whereas, PTT system A is a cellular system that enables push-to-talk services using a Push to talk over Cellular (PoC) technology such as one described in technical specifications published by Open Mobile Alliance (OMA), which uses Session Initiation Protocol (SIP) defined in Internet Engineering Task Force (IETF) Request for Comments (RFC) 3261 dated June 2002. However, the type of systems do not limit the scope of the teachings herein; such teachings are applicable for bridging group calls between any two disparate PTT systems having different call control protocols.

PTT System A includes a PTT server A (112), a base station 114, and PTT devices 116 and 118. PTT system B includes a PTT server B (120), a base station 124, and PTT devices 126 and 128, which in this case use a vocoder that is compliant with an APCO-25 common air interface. PTT systems A and B, depending on their particular implementation, can include other infrastructure devices (not shown) for a commercial embodiment that are commonly referred to as, but not limited to, bridges, switches, zone controllers, base station controllers, repeaters, base radios, base transceiver stations, access points, routers or any other type of infrastructure equipment facilitating communications between entities in a wireless or wired environment. The PTT servers A and B operate to establish, modify, and terminate communication sessions by and between PTT devices in their, respective, systems using their respective call control protocols.

In this embodiment, the PTT devices 116 and 118 wirelessly communicate with each other and with other communication devices in PTT system A and wirelessly communicate with the PTT server A via the intermediary base station 114. Likewise, the PTT devices 126 and 128 wirelessly communicate with each other and with other communication devices in PTT system B and wirelessly communicate with the PTT server B via the intermediary base station 124. The PTT devices 116, 118, 126, and 128 are also referred to in the art as communication devices, client entities, access devices, access terminals, user equipment, mobile stations, mobile subscriber units, mobile devices, and the like, and can be any standard communication device such as radios, mobile phones, two-way radios, cell phones, and any other device capable of PTT communications in a wireless environment.

PTT bridging gateway 102 is, in this implementation, coupled via a wired network to PTT systems A and B and, more particularly, coupled to PTT servers A and B to bridge group calls between the two systems in accordance with the teachings herein, as described in further detail below with respect to the signaling diagram shown in FIG. 1. PTT bridging gateway 102, in a further implementation, includes voice transcoding capabilities to reformat voice messages (e.g., packets, datagrams, and the like) received from one of the systems into a format compatible with receipt and processing in the other system, upon facilitating the bridging of calls between the two systems. Although not shown, PTT bridging gateway 102 comprises a memory, one or more network interfaces, and a processing device that are operatively coupled, and which when programmed form the means for the PTT bridging gateway 102 to implement its functionality. The network interfaces can be used for, one or more of: receiving and sending call control signaling for bridging group calls between PTT system A and PTT system B in accordance with the teachings herein; transferring voice messages between the two systems; and any other communications with elements in the PTT systems A and B to enable the implementation of methods in accordance with the present teachings. The implementation of the network interfaces in the PTT bridging gateway 102 depends on the particular type of network, i.e., wired and/or wireless, to which the PTT bridging gateway is connected. For example, where the network supports wired communications, the interfaces may comprise a serial port interface (e.g., compliant to the RS-232 standard), a parallel port interface, an Ethernet interface, a USB interface, and/or a FireWire interface, and the like. Where the network supports wireless communications, the interfaces comprise elements including processing, modulating, and transceiver elements that are operable in accordance with any one or more standard or proprietary wireless interfaces, wherein some of the functionality of the processing, modulating, and transceiver elements may be performed by means of the processing device of the PTT bridging gateway through programmed logic such as software applications or firmware stored on the memory device of the PTT bridging gateway.

Besides the above-mentioned functionality, implemented via programmed logic or code, the processing device of PTT bridging gateway 102 is further programmed with logic or code for performing signaling and functionality such as that included in signaling diagram and related functionality illustrated in FIG. 1; and/or the processing device may be implemented as a state machine or ASIC. The memory in the PTT bridging gateway 102 can include short-term and/or long-term storage of various data needed for the functioning of the PTT bridging gateway 102. More particularly, in accordance with the teachings herein, the memory within the PTT bridging gateway stores a client to group "mapping" that contains data that enables the PTT bridging gateway to bridge group calls between two disparate PTT systems. The mapping data can be stored in any suitable format that is accessible the PTT bridging gateway 102 including a table, lists, pointers to storage locations in the PTT bridging gateway, etc.

In one embodiment, the PTT bridging gateway includes a list or plurality 130 of clients in PTT system A, e.g., client 1 (132), client 2 (134), client 3 (136), etc., that are mapped to a list or plurality of groups 140 in PTT system B, e.g., group 1 (142), group 2 (144), group 3 (146), etc. More particularly, there is a one-to-one mapping between the clients in PTT system A and the groups in PTT system B meaning that only one client in PTT system A is mapped to only one group in PTT system B, and vice versa.

A "client" as that term is used herein is a logical representation of a device and/or user of the device for purposes of establishing a group session (call) for exchanging media. A group comprises a plurality of clients (also referred to as member clients of the group). In an embodiment, the clients 1, 2, 3, etc., located in the PTT bridging gateway are "virtual" clients. A "virtual" client, as that term is referred to herein, means a client that is a member of a group in one PTT system for the sole purpose of enabling the PTT bridging gateway to receive an invitation for a group call and, responsive to the invitation, to bridge the group call to include one or more member clients on a disparate PTT system.

As shown, and due to the implementation of the PTT systems in this illustrative embodiment, the PTT bridging gateway stores a PTT system A client to PTT system B group mapping. In other system implementation, PTT bridging gateway may store, alternatively or in addition to, a PTT system B client to PTT system A group mapping (not shown).

Turning now to the operation of the system elements in accordance with the teachings herein, a signaling diagram is illustrated in FIG. 1 that facilitates the bridging of group calls between two disparate PTT systems (in this case between PTT system A and PTT system B). For illustrative purposes, lets say that a member client of a group in PTT system A (e.g., the user of PTT device 116) wants to initiate a call with the other member clients of the group, at least one of which is using a PTT device connected to PTT system B (e.g., the user of PTT device 126). The user of device 116 selects the appropriate group (e.g., from a call list stored on device 116) and presses a PTT button on her device causing PTT device 116 to generate a call control message 150 comprising a group call request (e.g., a SIP INVITE in this illustrative embodiment) to be sent to the PTT server A.

An enabler for the bridging function in accordance with the teachings herein is that upon receiving group call request 150, the PTT server A knows to invite a member client to the call that is located in the PTT bridging gateway 102. This can be done, for example, by the group call request 150 including a group identifier (ID) that logically represents a list of member clients. Upon extracting the group ID from the group call request, the PTT server A, in a conventional manner, uses call control signaling to send a session invitation to each client member in the group, one of which is client 1. Client 1 can be pre-configured to be included as a member client of the group in the same manner as all of the other client members and this pre-configuration can be done in any known manner such as a manual configuration by a system operator. In accordance with another illustrative implementation, the PTT device 116 generates the group call request 150 having a list of member client IDs (e.g., creates an "ad hoc" group), which includes an ID for client 1, to which session invitations are to be sent.

In any event, the session invitations received by the member clients in PTT system A, including a session invitation 152 to client 1, do not include a group identifier. However, upon receiving the session invitation 152 for client 1, the PTT bridging gateway 102 contains logic that enables it to identify that client 1 is mapped 154 to group 1 in PTT system B. In which case, the PTT bridging gateway 102 uses the call control protocol of PTT system B to send a group call request 156 to the PTT server B to initiate invitations to the member clients of group 1. The member clients of group 1 are identified to the PTT server B depending on the particular call control protocol being used in that system. For instance, the PTT bridging gateway could include a group ID in the group call request 156 for group 1, which corresponds to certain clients in the PTT system B; or the PTT bridging gateway could include a list of member client IDs in the group call request 156 for group 1, which corresponds to certain clients in the PTT system B.

Upon receiving the group call request 156, the PTT server B uses its normal call control signaling to invite the member clients of group 1 to a group call. This includes, in this case, sending a group call invitation 158 to PTT device 126. In this manner, clients from PTT system A and PTT system B can be involved in the same group call without making changes to the call control signaling in either PTT system.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for bridging group calls between two disparate PTT systems described herein. The non-processor circuits may include, but are not limited to, a radio receiver, a radio transmitter, signal drivers, clock circuits, power source circuits, and user input devices. As such, these functions may be interpreted as steps of a method to perform the bridging of group calls between two disparate PTT systems described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for bridging group calls between two disparate push-to-talk (PTT) systems, the method comprising:

at a PTT bridging gateway between a first PTT system and a second disparate PTT system:
receiving an invitation to a first client to join a first group call for a first group comprising multiple member clients on the first PTT system, wherein the first client is one of the member clients of the first group and wherein the invitation is absent a group identifier for the first group;
determining that the first client is mapped to a second group comprising multiple member clients on the second PTT system, wherein the second PTT system implements a different communication technology, which employs a different call control protocol, than the first PTT system; and
initiating a second group call to the multiple member clients on the second PTT system.

2. The method of claim 1, wherein the invitation was generated by a PTT server in the first PTT system in response to receiving a PTT group call request from a different member of the first group, wherein the PTT group call request includes an identifier for the first group.

3. The method of claim 1, wherein the first client is a virtual client that is located in the PTT bridging gateway.

4. The method of claim 3 further comprising maintaining a mapping of the virtual client associated with the first PTT system to the second group associated with the second PTT system, wherein the virtual client is associated with a communication device of the first PTT system and is used for the sole purpose of bridging a group call between the communication device of the first PTT system and the second group associated with the second PTT system.

5. The method of claim 1, wherein the invitation was generated by a PTT server in the first PTT system in response to receiving a PTT group call request from a different member of the first group, wherein the PTT group call request includes a list comprising identifiers for the member clients of first group, including an identifier for the first client.

6. The method of claim 1, wherein initiating the second group call comprises sending a group call request to a PTT server in the second PTT server, which identifies the multiple member clients on the second PTT system.

7. The method of claim 1, wherein one of the first and second PTT systems is an APCO Project 25 compliant communication system and the other PTT system is a Push-to-Talk over Cellular (PoC) communication system.

8. A computer-readable storage element having computer readable code stored thereon for programming a computer to perform a method for bridging group calls between two disparate push-to-talk (PTT) systems, the method comprising:
at a PTT bridging gateway between a first PTT system and a second disparate PTT system:
receiving an invitation to a first client to join a first group call for a first group comprising multiple member clients on the first PTT system, wherein the first client is one of the member clients of the first group and wherein the invitation is absent a group identifier for the first group;
determining that the first client is mapped to a second group comprising multiple member clients on the second PTT system, wherein the second PTT system implements a different communication technology, which employs a different call control protocol, than the first PTT system; and
initiating a second group call to the multiple member clients on the second PTT system.

9. The computer-readable storage element of claim 8, wherein one of the first and second PTT systems is an APCO Project 25 compliant communication system and the other PTT system is a Push-to-Talk over Cellular (PoC) communication system.

10. The computer-readable storage element of claim 8, wherein the first client is a virtual client that is maintained in the PTT bridging gateway.

11. The computer-readable storage element of claim 10, wherein the method further comprises maintaining a mapping of the virtual client associated with the first PTT system to the second group associated with the second PTT system, wherein the virtual client associated with a communication device of the first PTT system and is used for the sole purpose of bridging a group call between the communication device of the first PTT system and the second group associated with the second PTT system.

12. A push-to-talk (PTT) bridging gateway between a first PTT system and a second disparate PTT system, the PTT bridging gateway comprising:
a first client;
an interface that receives an invitation to the first client to join a first group call for a first group comprising multiple member clients on the first PTT system, wherein the first client is one of the member clients of the first group and wherein the invitation is absent a group identifier for the first group; and
a processor that:
determines that the first client is mapped to a second group comprising multiple member clients on the second PTT system, wherein the second PTT system implements a different communication technology, which employs a different call control protocol, than the first PTT system; and
initiates a second group call to the multiple member clients on the second PTT system.

13. The push-to-talk (PTT) bridging gateway of claim 12, wherein one of the first and second PTT systems is an APCO Project 25 compliant communication system and the other PTT system is a Push-to-Talk over Cellular (PoC) communication system.

14. The push-to-talk (PTT) bridging gateway of claim 12, wherein the first client is a virtual client that is located in the PTT bridging gateway.

15. The push-to-talk (PTT) bridging gateway of claim 14, further comprising a memory that maintains a mapping of the virtual client associated with the first PTT system to the second group associated with the second PTT system, wherein the virtual client associated with a communication device of the first PTT system and is used for the sole purpose of bridging a group call between the communication device of the first PTT system and the second group associated with the second PTT system.

* * * * *